(12) United States Patent
Schiebenes et al.

(10) Patent No.: US 11,920,640 B2
(45) Date of Patent: Mar. 5, 2024

(54) SLAVE DEVICE FOR A CLUTCH SYSTEM AND CLUTCH SYSTEM FOR A VEHICLE

(71) Applicant: Schaeffler Technologies AG & Co. KG, Herzogenaurach (DE)

(72) Inventors: Andreas Schiebenes, Gaggenau (DE); Manuel Bassler, Achern (DE); Thomas Niesen, Karlsruhe (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/801,823

(22) PCT Filed: Feb. 3, 2021

(86) PCT No.: PCT/DE2021/100101
§ 371 (c)(1),
(2) Date: Aug. 24, 2022

(87) PCT Pub. No.: WO2021/170173
PCT Pub. Date: Sep. 2, 2021

(65) Prior Publication Data
US 2023/0084446 A1    Mar. 16, 2023

(30) Foreign Application Priority Data
Feb. 26, 2020   (DE) .................... 10 2020 105 010.0

(51) Int. Cl.
*F16D 25/08*    (2006.01)
*F16D 13/52*    (2006.01)

(52) U.S. Cl.
CPC .......... *F16D 25/083* (2013.01); *F16D 13/52* (2013.01)

(58) Field of Classification Search
CPC ................... F16D 25/083; F16D 13/52; F16D 2048/0212; F16D 2025/081
See application file for complete search history.

(56) References Cited

U.S. PATENT DOCUMENTS

| | | | | |
|---|---|---|---|---|
| 6,035,989 A | * | 3/2000 | Matsuoka | F16H 45/02 192/85.25 |
| 2006/0054444 A1 | | 3/2006 | Bishop et al. | |
| 2011/0114436 A1 | * | 5/2011 | Noehl | F16C 37/00 192/48.601 |

(Continued)

FOREIGN PATENT DOCUMENTS

| | | |
|---|---|---|
| DE | 19833216 A1 | 2/1999 |
| DE | 102008052446 A1 | 5/2009 |
| DE | 102018113945 B3 | 9/2019 |

*Primary Examiner* — Jacob S. Scott
*Assistant Examiner* — Farhana Pervin

(57) ABSTRACT

A slave device is provided for a clutch system of a motor vehicle, in particular a clutch slave cylinder, in the form of a concentric slave cylinder. The slave device includes a housing element having, in its interior, a pressure chamber and an annular gap arranged on the outside of the housing element wherein the annular gap is in fluid communication with the pressure chamber. A clutch system for a vehicle includes the slave device, clutch apparatus for connecting an input side to an output side, a transmission housing on the output side, and seals of the slave device lying against the transmission housing in the radial direction for sealing the annular gap.

9 Claims, 1 Drawing Sheet

(56) References Cited

U.S. PATENT DOCUMENTS

| | | | |
|---|---|---|---|
| 2013/0062980 A1* | 3/2013 | Kuwahara | B60K 6/48 |
| | | | 310/78 |
| 2014/0262674 A1* | 9/2014 | Saito | F16D 25/083 |
| | | | 192/70.11 |
| 2018/0163791 A1* | 6/2018 | Jeong | B60K 17/02 |
| 2019/0178306 A1* | 6/2019 | Barnes | F16D 25/083 |

* cited by examiner

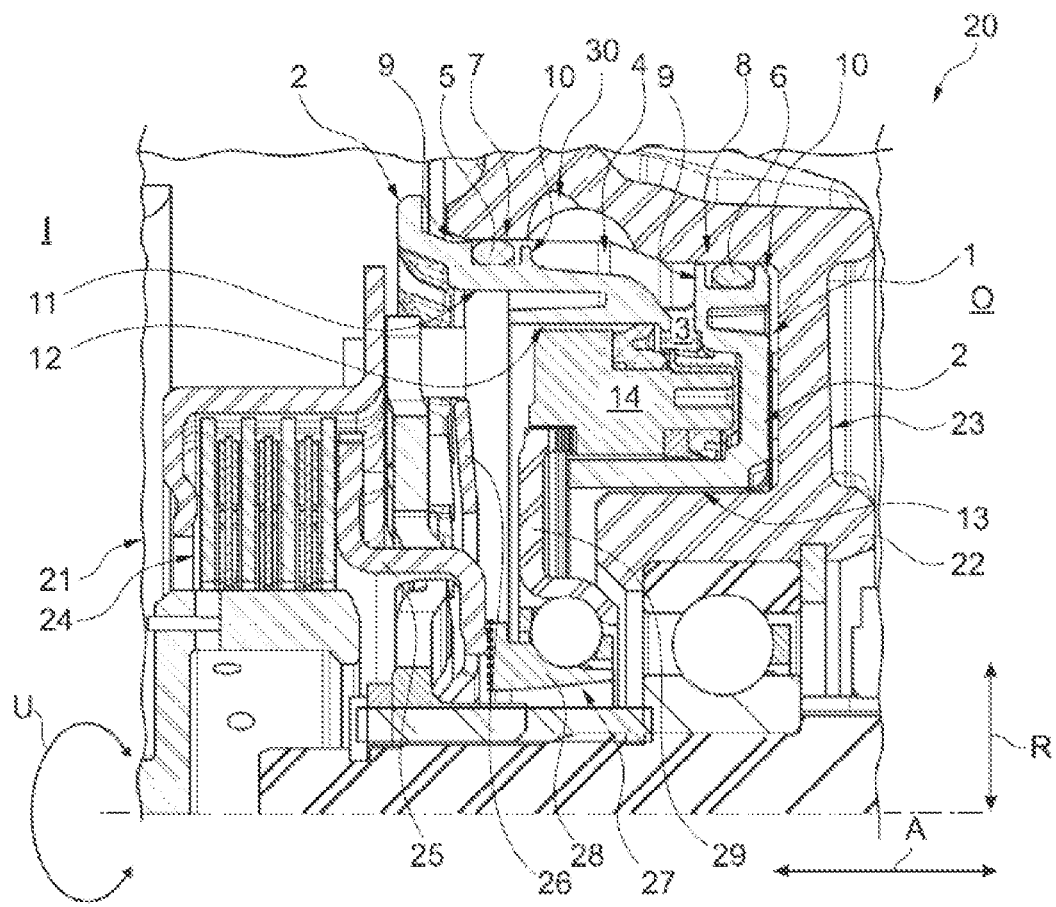

SLAVE DEVICE FOR A CLUTCH SYSTEM AND CLUTCH SYSTEM FOR A VEHICLE

CROSS-REFERENCE TO RELATED APPLICATIONS

This application is the U.S. National Phase of PCT Appln. No. PCT/DE2021/100101 filed Feb. 3, 2021, which claims priority to DE 102020105010.0 filed Feb. 26, 2020, the entire disclosures of which are incorporated by reference herein.

TECHNICAL FIELD

The disclosure relates to a slave device for a clutch system of a motor vehicle, in particular a clutch slave cylinder, preferably designed as a concentric slave cylinder, and a clutch system for a vehicle, in particular for an automobile having a slave device.

BACKGROUND

In conventional CSC applications or concentric slave cylinder applications, whether for dry clutches or wet clutches, the CSC or the housing thereof is screwed axially onto a transmission housing.

Here, an operating medium or a fluid is conveyed from an actuating unit or a master device into a pressure chamber of the CSC via what is termed a whistle, which is arranged on a bore in the housing of the CSC, so that the operating medium reaches a pressure chamber inside the CSC.

The aforementioned type of attachment of the CSC to the transmission housing is time-consuming and thus requires increased assembly work.

SUMMARY

It is therefore the object of the present disclosure to specify a slave device for a clutch system of a motor vehicle, in particular a clutch slave cylinder, and a clutch system for a vehicle, which can be produced inexpensively and ensures simplified assembly.

According to the disclosure, this object is achieved by the features described here. Further advantageous developments form the subject matter of the present disclosure.

According to the disclosure, in a first aspect, a slave device for a clutch system of a motor vehicle, in particular a clutch slave cylinder, preferably designed as a concentric slave cylinder:
  a housing element which has a pressure chamber in the interior thereof,
  wherein an annular gap is arranged on the outside of the housing element, which is in fluid communication with the pressure chamber.

With the aid of the annular gap, it is possible in a simple manner to connect the pressure chamber at any point on the circumference of the housing element to an inflow, which supplies an operating medium from a master device to the slave device. Thus, e.g., an annular piston element relative to the housing element to actuate a clutch apparatus. This simplifies assembly, since a manual connection of a pressure hose to what is termed a whistle, which is arranged on the housing element of the slave device, is no longer necessary. The correct placement or laying of the pressure hose within a clutch system, which connects a master device to a slave device, is also eliminated. This also saves assembly time.

The annular gap preferably runs around the outside in the circumferential direction on the housing element. In other words, it is advantageous that the annular gap is formed by the housing element and runs in a circle in the circumferential direction around the outside of the housing element.

It is also preferred that the annular gap has a funnel-shaped cross-section in relation to the axial direction.

The pressure chamber is preferably arranged at the narrow end of the funnel-shaped configuration of the annular gap, so that fluid can flow from the annular gap to the pressure chamber.

In the present description, the "axial direction" is understood to mean that direction in which an annular piston element of the slave device can move relative to the housing element thereof.

Furthermore, in the present description, the term "circumferential direction" is understood to mean that direction along which, for example, a radial bearing rotates that is aligned on an axis that extends in the axial direction.

At least one seal is advantageously arranged on the outside of the housing element to seal the annular gap and thus the slave device with respect to a transmission housing of a clutch system.

The at least one seal is preferably designed as an O-ring.

Furthermore, it is advantageous if the annular gap can be sealed by at least one seal in the axial direction. The at least one seal can also seal in the radial direction. Sealing in the axial and/or radial direction is possible if the at least one seal lies both on the housing element of the slave device and on a transmission housing of a clutch system.

It is also possible for two seals to be arranged to be offset in the axial direction with respect to the annular gap on the housing element.

In addition, it can be provided that, seen in the axial direction, a first seal is arranged in front of the annular gap and a second seal is arranged after the annular gap. The annular gap can thus be sealed off from a transmission housing of a clutch system.

The housing element advantageously has at least one receptacle per seal on the outside. With the help of this receptacle, the axial location of a seal on the housing element of the slave device can be determined.

Furthermore, it is advantageous if the at least one receptacle is designed as a pocket in a cross-section in the axial direction. A seal can thus be held in a receptacle on the slave device in a simple manner, in particular during pre-assembly.

Furthermore, it is advantageous if the at least one receptacle comprises two side webs that extend outwards in the radial direction. Thus, the axial position of a seal on the housing element can be predetermined.

In the present description, the term "radial direction" is understood to mean the direction that runs perpendicular to the axial direction.

The housing element preferably has a first side wall in the axial direction, which connects the two side webs together, which form the at least one receptacle.

It is possible here for the first side wall to be interrupted in the axial direction by the annular gap.

Provision can also be made for the annular gap to be arranged between two receptacles.

The housing element preferably has a second and a third side wall.

In embodiments, the second and third side walls are arranged concentrically to one another to accommodate an annular piston element and to form the pressure chamber between the housing element and the annular piston element.

The second side wall is preferably interrupted in the axial direction by the annular gap. It is favorable here if the first and second side walls are connected to one another.

Furthermore, it is possible for a partial section of the first and second side wall to form the funnel-shaped annular gap.

Advantageously, the slave device has an annular piston element, which is designed to be displaceable relative to the housing element and is arranged between a second and third side wall of the housing element.

In addition, it is advantageous if the pressure chamber is formed between the annular piston element and the housing element.

A second aspect of the present disclosure comprises a clutch system for a vehicle, in particular for an automobile.

It is expressly noted that the features of the slave device as mentioned in the first aspect of the disclosure can find application in the clutch system, both individually or in combination with one another.

In other words, the features mentioned above under the first aspect of the disclosure relating to the slave device can also be combined with further features under the second aspect of the disclosure.

A clutch system for a vehicle, in particular for a motor vehicle, specifically for an automobile, preferably comprises:
a slave device according to the first aspect,
a clutch apparatus for connecting an input side of the clutch system to an output side of the clutch system, and
a transmission housing on the output side,
wherein seals of the slave device lie against the transmission housing in the radial direction to seal the annular gap of the slave device in the axial and radial direction, in particular in interaction with the transmission housing.

Furthermore, it is preferred that the transmission housing of the clutch system has an inflow which is fluid-mechanically connected to the annular gap of the slave device or is in fluid communication to use a fluid or an operating medium to control the slave device, in particular the annular piston element thereof, corresponding to moving the fluid shifted by a master device.

It is also conceivable that the transmission housing of the clutch system and the housing element of the slave device are not connected to one another in the axial direction via fastening means. In other words, it is advantageous if only the at least one seal of the slave device fixes the radial position of the slave device relative to the transmission housing of the clutch system.

The transmission housing preferably has a base element which runs in the radial direction and opposite which the housing element of the slave device is arranged, advantageously without the transmission housing and housing element being fastened to one another.

In addition, it is advantageous if the clutch apparatus has a disk pack and a clutch part for compressing or releasing the disk pack, so that the input side can be connected or disconnected to the output side of the clutch system.

Furthermore, it can be provided that the clutch apparatus comprises a disk spring element that prestresses the clutch part in one position. In this prestressed position, the annular piston element is preferably engaged or the annular piston element is pressed in the direction of the pressure chamber. The pressure chamber of the slave device is therefore not supplied with pressurized fluid, as a result of which the annular piston element can be displaced in the direction of the pressure chamber.

The disk spring element, in interaction with the transmission housing, advantageously causes the relative axial position of the slave device to be fixed in relation to the transmission housing of the clutch system.

It is also possible for the disk spring element to be arranged between a bearing arrangement of the clutch system and the clutch part.

The slave device is preferably arranged between the base element and the clutch apparatus. The slave device is thus braced in the axial direction between the base element and the clutch apparatus, as a result of which the slave device is axially fixed.

In addition, it is conceivable that the clutch system is arranged in the wet region of a vehicle, in particular a hybrid module.

The clutch system favorably has a bearing arrangement for actuating the clutch apparatus.

It is favorable if the bearing arrangement is arranged on the annular piston element of the slave device to apply a force via the annular piston element to a clutch part of the clutch apparatus, so that the input side can be connected to the output side via a disk pack, or preferably both sides can be detached from one another.

The bearing arrangement for actuating the clutch apparatus preferably comprises a bearing inner ring and a bearing outer ring as well as rolling elements advantageously arranged therebetween.

The inventive concept presented above will be further described in other words below.

When using a CSC (or a concentric slave cylinder), for example in the wet region of a hybrid module, where the CSC is operated via a pump in the wet region, the CSC is controlled by an operating medium or fluid pressurized by the pump.

For example, if the pressurized fluid moves in the direction of the concentric slave cylinder, e.g., an annular piston element of the slave device extends in the direction of a clutch apparatus of a clutch system. In this way, the force generated by the slave device or by the moving annular piston element thereof is absorbed by the clutch apparatus. In other words, the wet clutch or the clutch apparatus provides a counterforce to the annular piston element.

With such an arrangement, only a small installation space is available in which the CSC is connected to a bell housing or a transmission housing to support the force generated by the moving annular piston element in the direction of the clutch apparatus.

Precisely this specified installation space preferably requires a special connection of the CSC in the bell housing and preferably a new kind of supply of the operating medium into the pressure chambers of the CSC or the concentric slave cylinder.

Against this background, the primary task is to create a new type of connection for the CSC in the bell housing or the transmission housing in the wet region of a hybrid module, as well as a new way of supplying the operating medium.

In short, the solution is to provide a housing element of the slave device with an external pressure chamber or with an annular gap running outside the housing element, which is in fluid communication with a pressure chamber inside the housing element of the slave device.

In this context, it is advisable to connect the CSC and the operating fluid supply thereof via a radial O-ring connection.

Briefly summarized, the idea of the disclosure lies preferably—in simplified terms—in the connection of the CSC or the slave device and the supply thereof with operating medium/fluid via a radial O-ring connection on a transmission housing.

BRIEF DESCRIPTION OF THE DRAWINGS

The disclosure will be explained in more detail below using an exemplary embodiment in conjunction with an associated drawing. The FIGURE schematically shows the following:

FIG. 1 shows a sectional view in the axial direction of a clutch system according to the disclosure having a slave device.

DETAILED DESCRIPTION

FIG. 1 shows a sectional view in axial direction A of a clutch system 20 according to the disclosure having a slave device 1.

Shown in more detail and briefly summarized, FIG. 1 shows a clutch system 20 for a vehicle, in particular for an automobile.

Here, the clutch system 20 comprises a slave device 1 (will be explained in more detail below), a clutch apparatus 21 for connecting an input side I of the clutch system 20 to an output side O of the clutch system 20, and a transmission housing 22 on the output side O.

Furthermore, seals 5, 6 of the slave device 1 lie against the transmission housing 22 in the radial direction R to seal off an annular gap 4 of the slave device 1 in the axial and radial directions A, R.

Described more specifically, FIG. 1 shows a slave device 1 for a clutch system 20 of a motor vehicle, in particular a clutch slave cylinder designed as a concentric slave cylinder.

The slave device 1 has a housing element 2 which has a pressure chamber 3 in the interior thereof, and an annular gap 4 which is arranged on the outside of the housing element 2 and which is in fluid communication with the pressure chamber 3.

Here, the annular gap 4 runs around the outside in the circumferential direction U on the housing element 2 and has a funnel-shaped cross-section to the axial direction A.

Furthermore, FIG. 1 shows that the pressure chamber 3 is arranged at the narrow end of the funnel-shaped configuration of the annular gap 4, so that fluid can flow from the annular gap 4 to the pressure chamber 3.

FIG. 1 also shows that two seals 5, 6, each designed as an O-ring, are arranged on the outside of the housing element 2 to seal the annular gap 4 and thus the slave device 1 from the transmission housing 22 of the clutch system 20.

The two seals 5, 6 are offset in the axial direction A to the annular gap 4 on the housing element 2, so that the annular gap 4 in the axial direction A can be sealed by the seals 5, 6.

Described more precisely, viewed in the axial direction A, a first seal 5 is arranged in front of the annular gap 4 and a second seal 6 is arranged after the annular gap 5.

Furthermore, the housing element 2 has one receptacle 7, 8 per seal 5, 6 on the outside, with each receptacle 7, 8 being designed as a pocket in a cross-section in the axial direction A.

The pocket or each receptacle 7, 8 has two side webs 9, 10, which extend outwards in the radial direction R.

In addition, the housing element 2 has a first side wall 11 in the axial direction A, which connects the two side webs 9, 10 to one another, which form the receptacles 7, 8.

As FIG. 1 shows, the first side wall 11 is interrupted by the annular gap 4 in the axial direction A, wherein the annular gap 4 is arranged between the two receptacles 7, 8.

Furthermore, the housing element 2 has a second and a third side wall 12, 13 which are arranged concentrically to one another to accommodate an annular piston element 14 and to form the pressure chamber 3 between the housing element 2 and the annular piston element 14.

The second side wall 12 is also interrupted by the annular gap 4 in the axial direction A, wherein a partial section of the first and second side walls 11, 12 forms the funnel-shaped annular gap 4 in each case.

In addition, FIG. 1 shows that the slave device 1 has an annular piston element 14 which is designed to be displaceable relative to the housing element 2 and is arranged between the second and third side walls 12, 13 of the housing element 2.

A pressure chamber 3 is formed between the annular piston element 14 and the housing element 2.

With regard to the clutch system 20, it should be noted that the transmission housing 22 of the clutch system 20 has an inflow 30 which is fluid-mechanically connected to the annular gap 4 of the slave device 1 to use a fluid or an operating medium to move the slave device 1, in particular the annular piston element 14 thereof, corresponding to the fluid displaced by a master device (not shown).

The transmission housing 22 of the clutch system 20 and the housing element 2 of the slave device 1 are not connected to one another in the axial direction A via fastening means.

FIG. 1 also shows that the transmission housing 22 has a base element 23 that runs in the radial direction R and opposite which the housing element 2 of the slave device 1 is arranged without the transmission housing 22 and housing element 2 being fastened to one another.

In addition, the clutch apparatus 21 has a disk pack 24 and a clutch part 25 for compressing or releasing the disk pack 24, so that the input side I can be connected to the output side O of the clutch system 20 or separated.

The clutch apparatus 21 also comprises a plate spring element 26 which prestresses the clutch part 25 into a position, wherein the disk spring element 26 is arranged between a bearing arrangement 27 of the clutch system 20 and the clutch part 25.

The slave device 1 is arranged between the base element 23 and the clutch apparatus 21.

In summary, it can be stated that the disk spring element 26 in cooperation with the transmission housing 22 causes the relative axial position of the slave device 1 to be fixed in relation to the transmission housing 22 of the clutch system 20.

In contrast, the seals 5, 6 of the slave device 1 determine the relative radial position of the slave device 1 to the transmission housing 22 of the clutch system 20.

It should also be noted that the clutch system 20 is arranged in the wet region of a hybrid module.

It can also be seen from FIG. 1 that the clutch system 20 has a bearing arrangement 27 for actuating the clutch apparatus 21.

The bearing arrangement 27 is arranged on the annular piston element 14 of the slave device 1 to apply a force via the annular piston element 14 to a clutch part 25 of the clutch apparatus 21, so that the input side I can be brought into connection with the output side O via the disk pack 24 or both sides can be detached from one another.

The bearing arrangement 27 has a bearing inner ring 28 and a bearing outer ring 29 and rolling bodies arranged therebetween for actuating the clutch apparatus 21.

In the following, FIG. 1 is described again in other words.

The CSC 1 or the slave device 1 is centered radially in the transmission housing 22 and thereby guided via an O-ring connection 5, 6 or via seals 5, 6.

An axial connection is not necessary since the CSC 1 is axially prestressed via the clutch part 25 or via the clutch part 25 of the clutch apparatus 21 and the operating pressure presses the CSC housing or the housing element 2 into the seat thereof in the transmission housing 22.

The operating medium is fed into the pressure chamber 3 via a bore 30 or via an inflow 30 in the transmission bell housing/in the transmission housing 22, which opens into the annular gap 4, which runs around the CSC 1.

This annular gap 4 is circumferential on the CSC 1 or on the slave device 1 and is sealed off from the transmission housing 22 by the O-rings 5, 6 or seals 5, 6.

LIST OF REFERENCE SYMBOLS

1 Slave device
2 Housing element
3 Pressure chamber
4 Annular gap
5 Seal
6 Seal
7 Receptacle
8 Receptacle
9 Side web
10 Side web
11 First side wall
12 Second side wall
13 Third side wall
14 Annular piston element
20 Clutch system
21 Clutch apparatus
22 Transmission housing
23 Base element
24 Disk pack
25 Clutch part
26 Disk spring element
27 Bearing arrangement
28 Bearing inner ring
29 Bearing outer ring
30 Inflow
I Input side
O Output side
U Circumferential direction
A Axial direction
R Radial direction

The invention claimed is:

1. A slave device for a clutch system of a motor vehicle, comprising:
a housing element having, in its interior, a pressure chamber,
wherein an annular gap is arranged on an outside of the housing element and the annular gap is in fluid communication with the pressure chamber,
wherein at least one seal is arranged on the outside of the housing element to seal the annular gap, and thus the slave device, from a transmission housing of a clutch system,
wherein the annular gap is sealable in an axial direction by at least one seal,
wherein two seals are offset on the housing element in the axial direction to the annular gap,
wherein a first seal is arranged in front of the annular gap and a second seal is arranged after the annular gap, viewed in the axial direction.

2. The slave device according to claim 1,
wherein the annular gap runs around the outside of the housing element in a circumferential direction,
wherein the annular gap has a funnel-shaped cross-section in an axial direction,
wherein the pressure chamber is arranged at a narrow end of the funnel-shaped cross-section of the annular gap so that fluid can flow from the annular gap towards the pressure chamber.

3. The slave device according to claim 1,
wherein the housing element has at least one receptacle per seal on the outside,
wherein the at least one receptacle is designed as a pocket in a cross-section in the axial direction,
wherein the at least one receptacle comprises two side webs which extend outwards in a radial direction,
wherein the housing element has a first side wall in the axial direction, which connects the two side webs to one another, which form the at least one receptacle,
wherein the first side wall is interrupted by the annular gap in the axial direction,
wherein the annular gap is arranged between two receptacles.

4. The slave device according to claim 1,
wherein the housing element has a first side wall, a second side wall and a third side wall,
wherein the second and third side walls are arranged concentrically to one another to accommodate an annular piston element and to form the pressure chamber between the housing element and the annular piston element,
wherein the second side wall is interrupted by the annular gap in an axial direction,
wherein in each case a partial section of the first and second side wall forms the annular gap.

5. The slave device according to claim 1,
wherein the slave device has an annular piston element which is designed to be displaceable relative to the housing element and is arranged between a second and third side wall of the housing element,
wherein the pressure chamber is formed between the annular piston element and the housing element.

6. A clutch system for a vehicle comprising:
a slave device comprising a housing element having, in its interior, a pressure chamber, wherein an annular gap is arranged on an outside of the housing element and the annular gap is in fluid communication with the pressure chamber,
a clutch apparatus for connecting an input side of the clutch system to an output side of the clutch system, and
a transmission housing on the output side,
wherein seals of the slave device lie against the transmission housing in a radial direction in order to seal the annular gap of the slave device in an axial direction and in the radial direction.

7. The clutch system according to claim 6,
wherein the transmission housing of the clutch system has an inflow which is fluid-mechanically connected to the annular gap of the slave device to use a fluid to move the slave device,
wherein the transmission housing of the clutch system and the housing element of the slave device are not connected to one another in the axial direction via fastening means,
wherein the transmission housing has a base element which runs in the radial direction and opposite which the housing element of the slave device is arranged, without the transmission housing and housing element being fastened to one another.

8. The clutch system according to claim 7,
wherein the clutch apparatus has a disk pack and a clutch part for compressing or releasing the disk pack, so that the input side can be connected to or disconnected from the output side of the clutch system,
wherein the clutch apparatus comprises a disk spring element which prestresses the clutch part in a position,
wherein the disk spring element is arranged between a bearing arrangement of the clutch system and the clutch part,
wherein the slave device is arranged between the base element and the clutch apparatus,
wherein the clutch system is arranged in a wet region of a hybrid module.

9. The clutch system according to claim 8,
wherein the bearing arrangement is configured for actuating the clutch apparatus,
wherein the bearing arrangement is arranged on an annular piston element of the slave device to apply a force via the annular piston element to a clutch part of the clutch apparatus, so that the input side can be connected to the output side via a disk pack,
wherein the bearing arrangement for actuating the clutch apparatus comprises an inner bearing ring and an outer bearing ring.

\* \* \* \* \*